June 29, 1948.  D. E. AUSTIN  2,444,025
STEERABLE DUAL WHEEL MOUNTING ON A VEHICLE AXLE
Filed Jan. 3, 1944  5 Sheets-Sheet 1
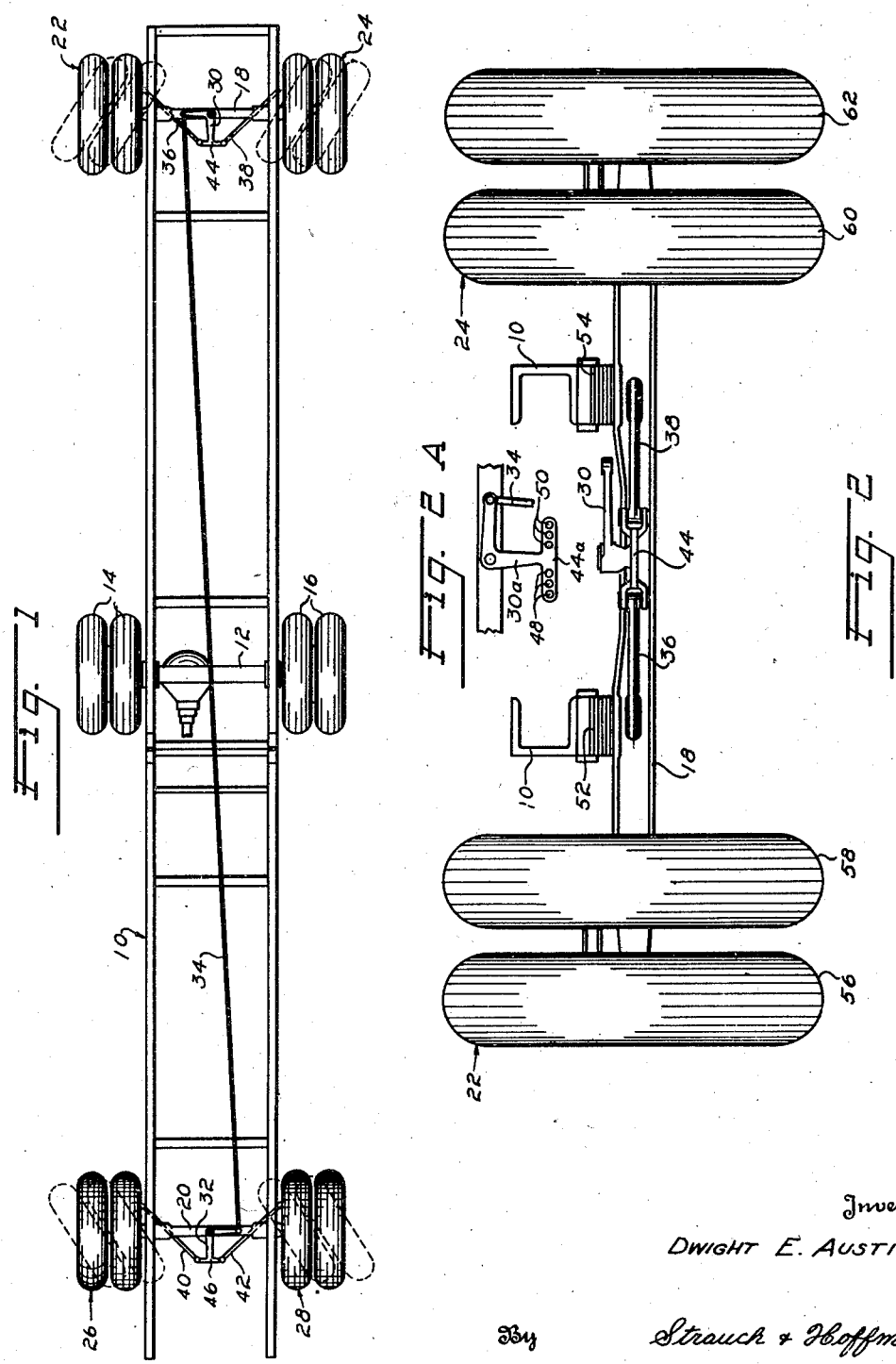
Inventor
DWIGHT E. AUSTIN
By Strauch & Hoffman
Attorneys

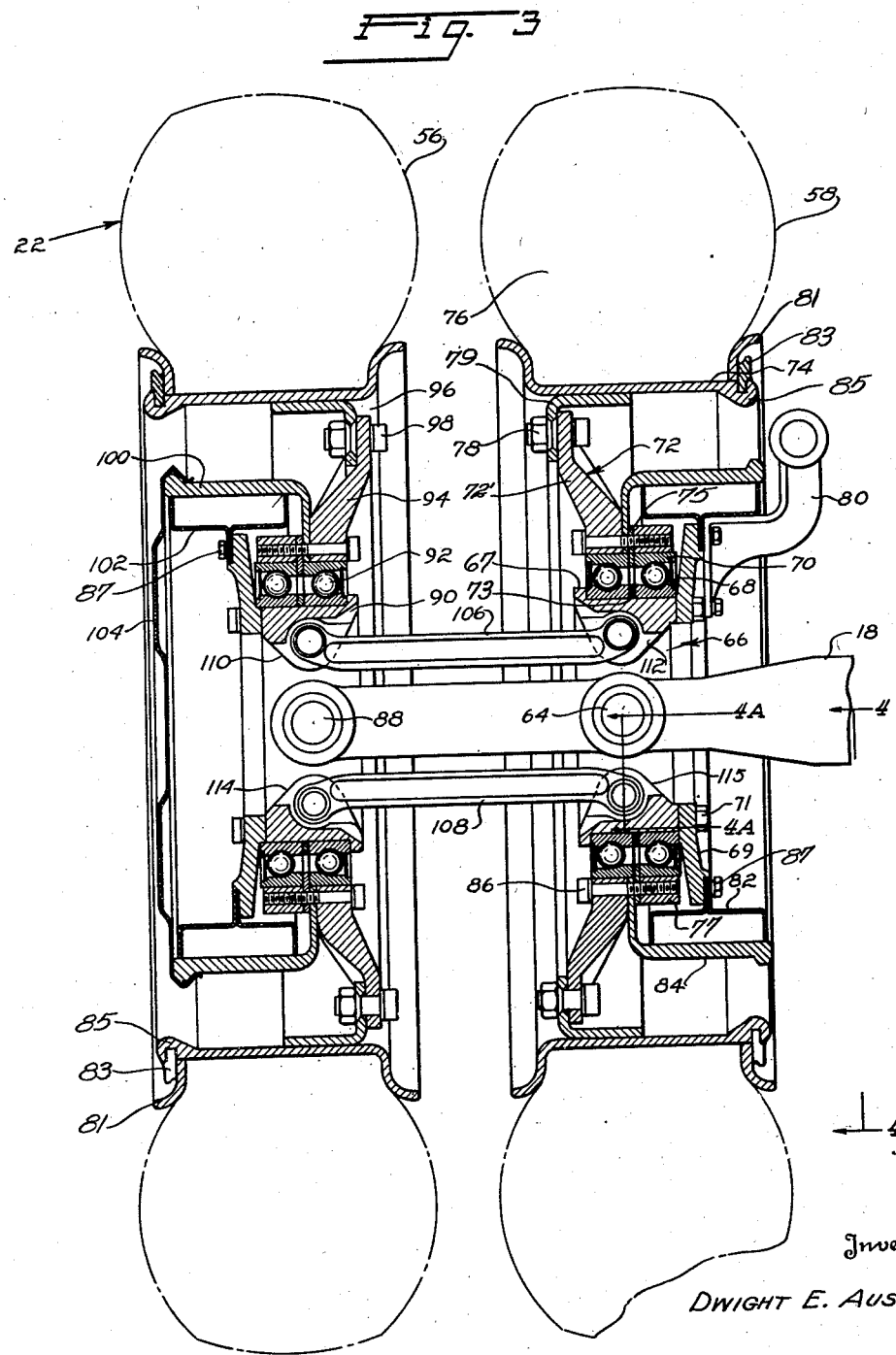

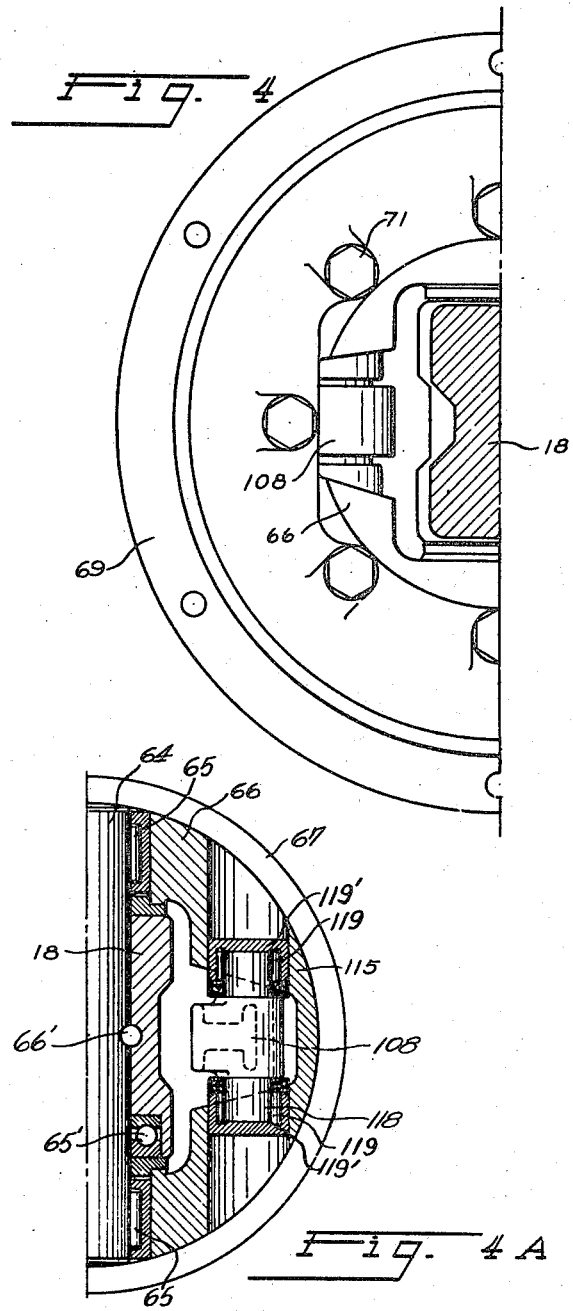

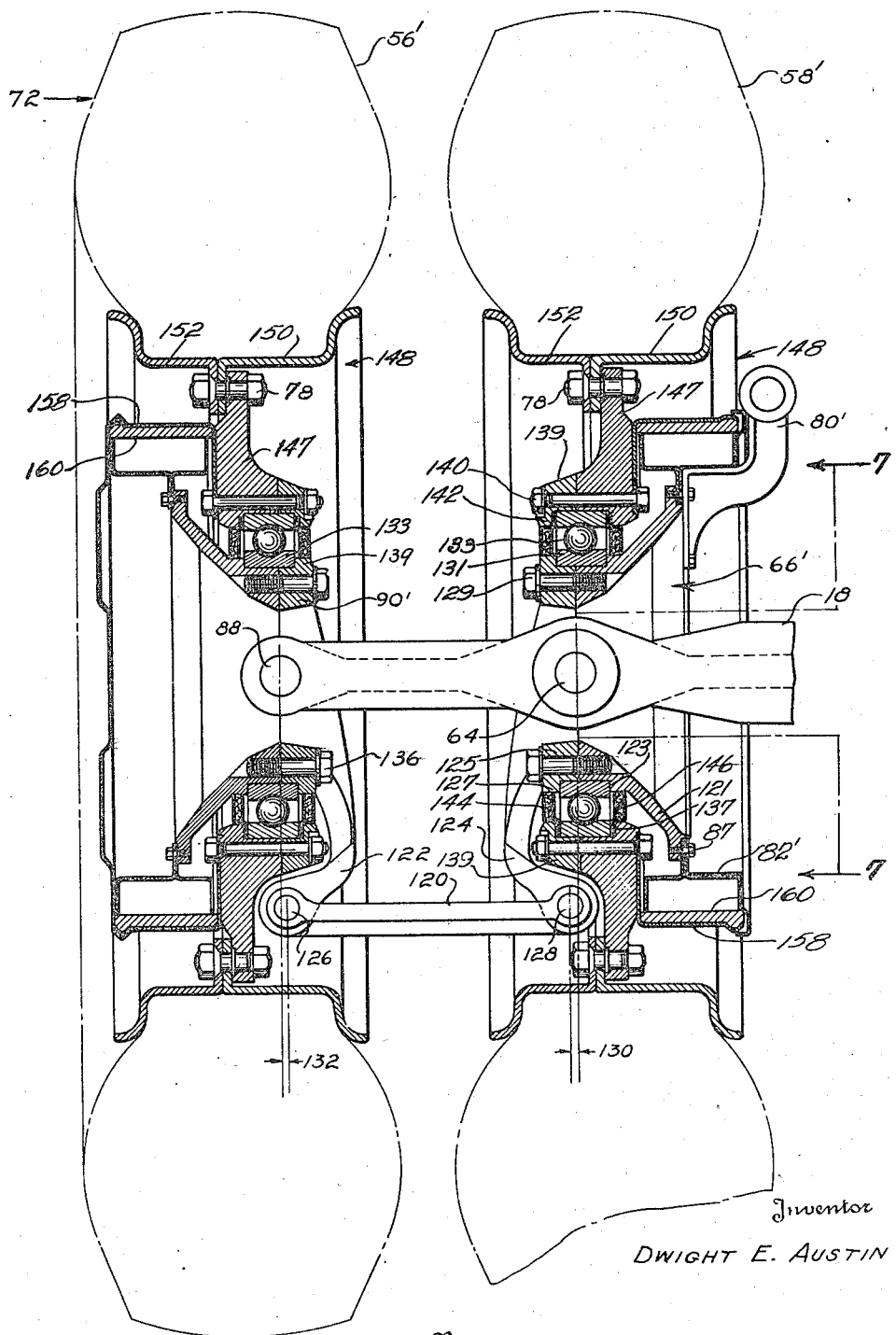

June 29, 1948.  D. E. AUSTIN  2,444,025
STEERABLE DUAL WHEEL MOUNTING ON A VEHICLE AXLE
Filed Jan. 3, 1944  5 Sheets-Sheet 5

Inventor
DWIGHT E. AUSTIN

By Strauch & Hoffman
Attorneys

UNITED STATES PATENT OFFICE 2,444,025

STEERABLE DUAL WHEEL MOUNTING ON A VEHICLE AXLE

Dwight E. Austin, Kent, Ohio, assignor to Twin Coach Company, Kent, Ohio, a corporation of Delaware Application January 3, 1944, Serial No. 516,810

17 Claims. (Cl. 280—95)

This invention relates to improved wheel, axle and steering mechanism for motor vehicles and has particular reference to an improved wheel mounting and steering mechanism for a vehicle having steerable dual wheels.

It has been proposed to provide steerable dual wheels on a vehicle by placing two rim members and two tires on a single hub member and provide a single pivotal connection between the hub member and the axle. Such a construction causes heavy tire wear because of the scrubbing action of the tires when the wheels are turned and also renders the steering of the vehicle difficult and uncertain because, with such a dual tire wheel, the steering mechanism cannot be adjusted properly to bring the axis of rotation of the respective wheels in line with respective radii of the turning circle of the vehicle. It is also impossible with such a construction to obtain proper camber and caster effect to provide self-centering of the steering mechanism and the minimum steering effort.

It is, therefore, the primary object of the present invention to provide an improved vehicle wheel, axle, wheel mounting and steering arrangement in which the steerable dual wheels are of simplified and economical construction, are independently mounted and each has an independent pivotal connection with the vehicle axle.

It is also an object to provide an improved wheel construction in which the principal components of the wheel are provided as stamped metal units requiring a minimum of machining to place them in finished condition.

Another object resides in an improved arrangement for supporting the rotatable portion of a vehicle wheel upon a relatively non-rotatable hub portion thereof.

Still another object resides in the provision of a vehicle axle having means for supporting at each end thereof two spaced apart king pins for independently mounting the two wheels of a dual wheel set of vehicle road wheels.

It is a further object to interconnect such independent wheels in such a manner that their individual axes of rotation will be approximately in line with corresponding radii on the turning circle when the vehicle is turned.

A still further object resides in the provision of an improved steering linkage, connected to the inner wheels of the dual wheel pairs, particularly arranged to cause the rotational axes of such inner wheels to constantly intersect substantially at the center of the turning circle when the vehicle is turned.

Still another object resides in the provision of connecting linkage between the two wheels of each pair of dual wheels particularly arranged to cause the rotational axes of the outer wheels of the two pairs of dual wheels to constantly intersect substantially at the center of the turning circle when the vehicle is turned.

Other objects and advantages will become apparent from the detailed description, appended claims and accompanying drawings, wherein:

Figure 1 is a diagrammatic plan view of a vehicle chassis showing dual or double steerable wheel sets at each end of the chassis;

Figure 2 is a vertical elevational view on an enlarged scale of the wheel and axle construction at one end of the chassis illustrated in Figure 1 showing a pair of dual steerable wheels at each end of the axle;

Figure 2a is a plan view of a modified form of one of the steering link bell cranks illustrated in Figure 1;

Figure 3 is a horizontal sectional view on an enlarged scale through one pair of steerable wheels particularly showing the wheel mounting arrangement and system of links interconnecting the two wheels of the pair;

Figure 4 is an elevational view on a somewhat enlarged scale of one of the hub members shown in Figure 3, the axle being sectioned on the line 4—4 of Figure 3;

Figure 4A is a sectional view on a somewhat enlarged scale on the line 4A—4A of Figure 3;

Figure 5 is a view similar to Figure 3 showing a somewhat modified form of wheel connecting linkage;

Figure 6:
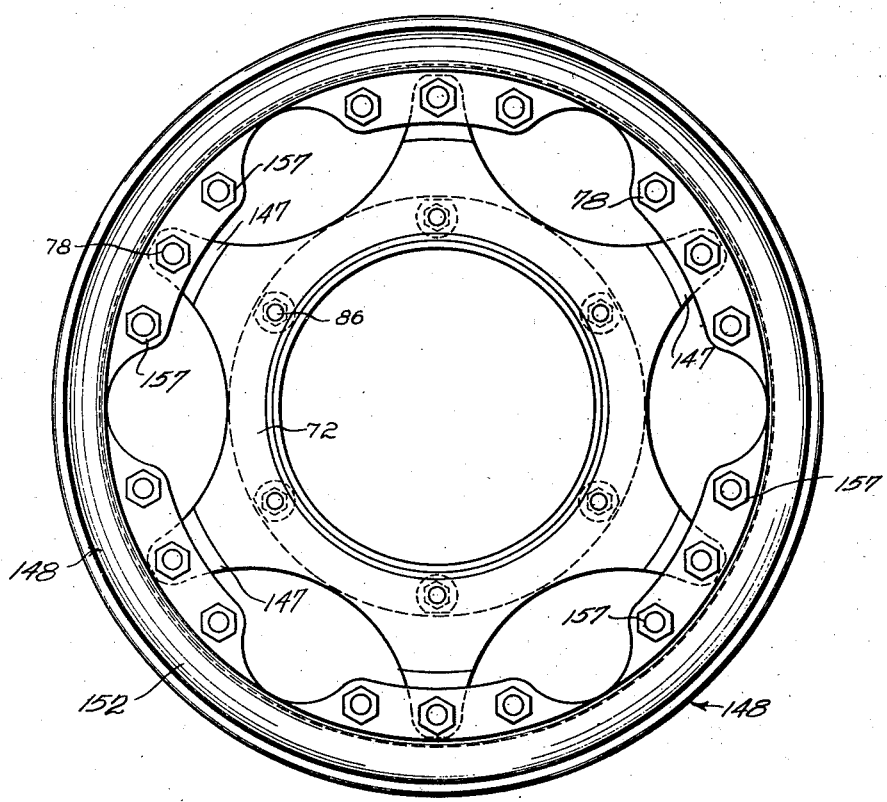
Figure 6 is an elevational view of the hub and rim structure of one of the wheels illustrated in Figure 5; and, Figure 7 is an elevational view of one of the hub members shown in Figure 5, the view being taken along the line 7—7 of Figure 5.

The accompanying drawings, in which like reference numerals are used to designate similar parts throughout, are for the purpose of illustration only and are not to be taken in a limiting or restrictive sense as it will be apparent to those skilled in the art that various changes in the illustrated embodiments may be resorted to without in any way exceeding the scope of the invention.

Referring to the drawings in detail and particularly to Figures 1 and 2, the numeral 10 generally indicates the vehicle chassis or frame. In the type of vehicle illustrated, a driving axle 12 having dual driving wheels 14 and 16 is disposed near the center of the frame and at each end of the vehicle there is disposed a dead axle, as indicated at 18 and 20, each carrying dual steerable wheels, the dual wheels for the front axle 18 being generally indicated at 22 and 24 and the dual wheels for the rear axle 20 being generally indicated at 26 and 28.

Preferably the frame 10 is hinged or jointed near the drive axle 12 so that all of the wheels may remain on the ground at all times. Each of the dead axles 18 and 20 pivotally supports a bell crank lever, as indicated at 30 and 32 respectively, interconnected by a suitably supported pivoted link member 34. A suitable link assembly for actuating link 34 is illustrated in United States Patent No. 2,251,584 issued August 5, 1941 to Frank R. Fageol and William B. Fageol. The bell crank 32 is similarly connected to the inner wheels of the dual wheel pairs 22 and 24 by respective steering link members 36 and 38 and the bell crank 32 is similarly connected to the inner wheels of the dual wheel pairs 26 and 28 by the respective steering link members 40 and 42. The link members 36—38 and 40—42 are in turn connected to cross bars, or T members as indicated at 44 and 46 respectively, formed on the bell cranks 30 and 32 and the member 34 is connected to bell crank arms on the respective bell cranks so that movement of one bell crank is transmitted to the other.

The bell cranks are pivotally mounted near the centers of the respective axles 18 and 20 and the cross bars or T members 44 and 46 are of a length such that, taken in combination with the wheel base of the vehicle, the angularity of the respective wheel connecting links 36—38 and 40—42 and the distance of the pivots at the wheel ends of these links from the axis of the king pins of the inner wheels, the rotational axes of the inner wheels of the dual wheel pairs are maintained substantially in alignment with the corresponding radii of the turning circle of the vehicle.

In Figure 2a there is shown a somewhat modified form of bell crank, indicated by the numeral 30a, in which the cross or T member 44a is provided with a plurality of spaced apertures as indicated at 48 and 50 by means of which the steering linkage may be accommodated to different distances between the dual wheel sets on the respective steering axles.

As the dead axle and steering wheel combinations at both ends of the vehicle are similar in all respects, a specific description of only one is considered necessary for the purpose of this disclosure and the axle 18 and wheel sets 22 and 24 have been selected for the purpose of this description and illustrated in greater detail in Figures 2–5, inclusive.

As particularly shown in Figure 2, the frame 10 is supported on the axle 18 by suitable or conventional springs 52 and 54 and each dual wheel set 22 and 24 includes two independently mounted wheels, as indicated at 56 and 58, and 60 and 62, respectively.

Since the two dual wheel sets or pairs are similar in all respects, except that one is left hand and the other is right hand, in order to simplify the description, it has been considered sufficient to provide a detailed illustration and description of only one set of dual wheels, the pair generally indicated at 22 having been selected for this purpose and particularly illustrated in Figure 3.

In Figure 3, the wheel 58 is connected to the axle 18 by means of a king pin 64 passing through the axle and journalled at its ends in bearings 65 mounted in diametrically opposed sides of a nonrotatable hub member 66, as particularly illustrated in Figure 4. This pin may be locked in position by convenient means such as a lock bolt 66' passed through the axle in a manner well known to the art. An axial thrust bearing 65' is preferably provided in the lower face of the ends of axle 18 to assure easy turning of wheel 58 on king pin 64.

This hub member 66 is formed in two parts, one of which is provided at one side with a peripheral flange 67. The other part is in the form of a ring plate 69 secured to the first part by suitable bolts 71 and providing between itself and the annular shoulder 67 an annular seat for an antifriction bearing 68 which rotatably supports the wheel on the hub member. This bearing is formed in two separable parts each complete with an inner race, an outer race and a set of antifriction elements therebetween. The two inner races are separated by a flat ring 73 and the outer races 70 are separated by a flat ring 75 separated from the ring 73 and clamped around its outer portion between the central portion of the wheel web member 72 and a clamp ring 77 secured to the web member by bolts 86. The hub is centrally apertured to receive the axle end and provides adequate clearance at each side of the axle for turning movements of the wheel about the corresponding king pin.

With this arrangement the wheel web 72 is held on the hub member 66 against lateral displacement by the flat ring or thrust plate 75 extending between the outer races of the anti-friction bearings. The inner races of the bearings are clamped on the hub member between the shoulder 67 and flange plate 69.

The web or spider member 72 has radially apertured legs or lug portions 72' secured by lug bolts 78 to an inwardly extending flange 79 of the two part pressed metal tire rim 74. The rim 74 preferably has the conventional removable tire retaining ring 81 held in place by a split snap ring 83 received in a groove provided in a rim bead 85. The flange 79 may be a portion of a stamping of L shaped cross section having one portion welded or otherwise secured to the inner surface of the rim 74.

A brake drum 84 is secured to wheel spider 72 by having a web portion thereof clamped between the spider and clamp ring 77, this web portion being apertured to threadedly receive bolts 86 which restrain the drum against rotational movement relative to the wheel spider when the brakes are applied. A brake shoe receptacle 82 in the form of a two part stamping of relatively thin sheet metal has a hollow annular portion within the annular flange portion of the drum 84 and overlapping web portions secured to the outer circumferential portion of hub plate 69 by suitable means, such as the cap screws 87.

Since the particular brake mechanism is not a part of the present invention, further description is not believed necessary.

Secured to the hub member 66 in a location horizontally displaced from the axle 18 and at the outer rim of the hub member is a bracket or steering arm 80 to which one end of a steering link member, in the example illustrated member 66, is pivotally connected. Lengthwise movement of the steering link will act on the steering arm to move the wheel about the axis of its respective king pin. A wheel 56 similar to the wheel 58 is mounted on the axle 18 by the king pin 88 which passes through the axle and is journalled at its ends in the hub member 90 and retained in place in the axle in the same manner as that described above in connection with wheel 58. The hub member 90 carries an antifriction bearing 92 similar to the bearing 68, supporting a web or spider member 94 secured to the rim 96 by lug bolts 98. A brake drum 100 is secured to the web member and overlies a sheet metal brake support or receptacle 102 secured to the hub member 90. If desired, the open end of the brake drum of the outer wheel may be covered by a suitable closure cap 104.

The two wheels 56 and 58 are linked together for simultaneous movement by a pair of links 106 and 108. The link member 106 is pivotally secured at one end to a lug 110 on the hub member 90 and is pivotally secured at the opposite end to a lug 112 on the hub member 66. The link 108 is similarly secured at its ends to lugs 114 and 116 on the hub members 90 and 66, respectively. Each pivotal connection preferably comprises a pin, as indicated at 118 in Figure 4A, passing through an apertured boss on the end of the link and journalled at its ends in the lugs on the hub member. Needle bearings 119 supported in bushings 119' pressed into the lug aperture are interposed between the pins and lugs at the pin ends in order to provide an antifriction mounting for the pins.

The links 106 and 108 are parallel and the axes of the pivotal connections of link 106 with lugs 110 and 114 are in a substantially vertical plane generally parallel to a plane including the axes of king pins 64 and 88. Similarly, the axes of the pivotal connections of the link 108 with the lugs 112 and 116 are in a substantially vertical plane generally parallel to the plane containing the axes of king pins 64 and 88.

With this arrangement, when the inner wheel 58 is turned about the king pin 64 by force exerted by the link 36 on the bracket 80, the outer wheel 56 will be forced to turn through exactly the same angle. As the distance between the axes of the king pins 64 and 88 is relatively small, compared to the distance to the turning center of the vehicle, this arrangement will provide an entirely satisfactory steering mechanism involving no appreciable tire wear or material increase in the steering effort. It is understood that the dual wheels at the opposite end of the axle are turned in the same manner by link 38.

Figure 7:
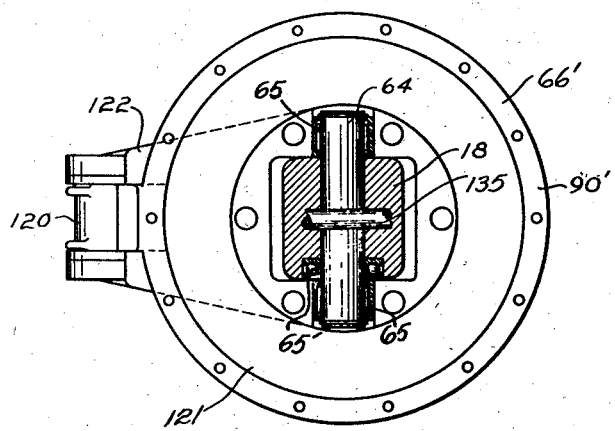

Ideally, however, the outer wheel should turn to a slightly different angle from the inner wheel of each dual wheel set to compensate for the distance between the two king pin axes, and a practical arrangement for accomplishing this purpose is shown in the modification illustrated in Figures 5 to 7.

In this modified form of the invention, the hub member is made in two separable parts divided along a plane perpendicular to wheel rotation and including the axis of the corresponding king pin. Referring to Figure 5 and particularly to the wheel 58', the hub member, generally indicated at 66', comprises a part 121, having an annular external shoulder 123 and a flared portion to the outer circumferential part of which the brake mechanism receptacle 82' is secured by cap screws 87 extending through radial flanges within the two part receptacle. The other hub part 125 has an annular shoulder 127 opposing the shoulder 123 and is secured to the part 121 by suitable bolts or cap screws 129. The inner race 131 of anti-friction bearing 133 is clamped in the annular groove provided in the hub member between the annular shoulders 123 and 125 by tightening action of the bolts 129.

The hub member is secured to the axle 18 by the king pin 64 which extends through an aperture in the axle and may be locked therein by a suitable lock bolt 135 (Figure 7), in a manner known to the art. The ends of the king pin are journaled by needle bearings in respective bushings held in suitable apertures in the hub member.

As is clearly illustrated in Figure 5 the hub member is formed to provide ample clearance at each side of the axle 18 to permit the wheel to turn about the king pin under control of the steering link 36. The wheel end of this link is connected to the hub member by an apertured steering arm 80', similar to the arm 80 of Figure 3, bolted or otherwise rigidly secured to the hub member.

The wheel web or spider has a central aperture provided with an annular shoulder 137 which bears against one side of the outer race of the bearing 133. A clamp ring 139 secured to the spider by suitable means such as the bolts or cup screws 140 is also provided with a shoulder 142 which bears against the opposite side of the outer bearing race securing the bearing to the wheel and thereby securing the wheel on the hub structure against lateral displacement. With this construction a single ball bearing or a pair of ball or roller bearings may be used as may be desired. Lubricant seals, as indicated at 144 and 146, are provided between the wheel spider and hub structure, one at each side of the bearing 133.

The spider member, as particularly illustrated in Figure 6, has apertured radial arms or lugs 147 to which the tire rim, generally indicated at 148, is secured. This rim is made in two separable portions, 150 and 152, provided with respective radially inwardly extending web portions 154 and 156 bolted together by bolt and nut assemblies 157 and secured to the lugs 147 by the lug bolts 78.

All of the hub and wheel parts may be conveniently formed of metal stampings and only a minimum of machine work is required.

A brake drum 158 is secured to the wheel spider and may conveniently comprise a sheet metal stamping having a web or disk portion apertured to receive the ends of the bolts 140 therethrough, and a cylindrical portion carrying a drum liner 160 overlying the receptacle 82'.

Since the construction of the outer wheel 56' is substantially the same as that of the inner wheel 58' a detailed description of the outer wheel is omitted in order to shorten and simplify the description.

The hub structures of the two wheels are linked together by a single link 120, pivotally connected at its ends to respective brackets 122 and 124 integral with hub members 66' and 90' extending outwardly beyond the circumference of the hub members and bifurcated to receive the link end bosses between the apertured lug portions thereof. Pins 126 and 128, similar to the pin 118 of Figure 4A, are used to connect the apertured link ends to the brackets.

The brackets 122 and 124 are so shaped that the axes of the link pins 126 and 128 are offset inwardly from the axes of the corresponding king pins by distances as indicated at 130 and 132 in Figure 5 so that the distance between vertical planes including the link pin axes and perpendicular to the center line of the link is less than the distance between vertical planes parallel to the above mentioned planes and including respectively the center lines of the king pins. With this arrangement the center line of the link 120 does not remain parallel to the center line of the axle 18 as the wheels are turned and the slight angle included between the center line of the link and the center line of the axle gives to the wheel 56' of set 24 nearest the turning center of the vehicle an angularity slightly greater than the angularity of its associated wheel 58' and the wheel 56' of the set of wheels 22 at the other end of axle 18 an angularity slightly less than the angularity of its associated wheel 58'. By accurately selecting the distance between the center line of the axle and the normal center line of link 120 and the distance the axes of the link pins are offset inwardly of the king pin axes, the axes of rotation of both the inner and outer wheels can be made to approximately intersect the turning center of the vehicle thus avoiding any scrubbing action whatever on the tires because of steering of the vehicle and substantially eliminating any additional steering effort occasioned by the dual wheel arrangement. It, of course, will be understood that the turning center of the vehicle shifts to the opposite side of the vehicle when the wheels are turned in the opposite direction and that the set of wheels 22 then become the nearest to the turning center and the set of wheels 24 become the set at the other end of the axle and the foregoing description properly describes the turning action in both directions.

By mounting each wheel of each dual wheel arrangement independently upon its own king pin, the correct camber, caster and toe-in effect can be given to each wheel so that the entire steering mechanism will have a definite self-centering action and the steering operation will be practically the same as the steering operation of single wheel arrangements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, an axle supporting said vehicle; two wheels on each end of said axle; an independent pivotal steering connection having its axis substantially diametrical of the corresponding wheel connecting each wheel and said axle; and means for turning said wheels about said pivotal steering connections relative to said axle.

2. In a vehicle having an axle adjacent one end thereof and a steering mechanism, a pair of road wheels on each end of said axle; a respective king pin pivotally securing each wheel to said axle; linkage mechanism connecting the inner wheels of the two pairs of wheels to said steering mechanism so as to turn said inner wheels about their respective king pins to steer said vehicle; and linkage means connecting the two wheels of each pair to constrain the outer wheels to follow the turning movements of said inner wheels.

3. In combination, a vehicle axle; a pair of wheels on one end of said axle; a king pin securing each wheel directly to said axle; and a link having its longitudinal center line in a plane normal to and intersecting both king pin axes and pivotally connected at its ends to said wheels.

4. In combination, a vehicle axle; a pair of wheels mounted in side by side relationship on one end of said axle; a non-rotatable hub portion in each wheel; a respective king pin connecting each hub portion to said axle and mounting said wheels for steering movement about said king pins relative to said axle; means including a bracket on the inner hub member for turning the inner wheel about its king pin; and means including a link disposed to one side of a plane including both king pin axes, pivotally secured at its ends to said hub members for turning the outer wheel with said inner wheel.

5. In combination, a vehicle axle; a pair of wheels mounted in side by side relationship on one end of said axle; a non-rotatable hub portion in each wheel; a respective king pin connecting each hub portion to said axle and mounting said wheels for steering movement about said king pins relative to said axle; means including a bracket on the inner hub member for turning the inner wheel about its king pin; and means including a pair of parallel links disposed one at each side of a plane including the axes of both king pins and pivotally secured at their ends to said hub members for turning the outer wheel with said inner wheel.

6. The combination as set forth in claim 5, wherein the axes of the two link pivots and the axis of the king pin all associated with the same hub member lie substantially in a single plane.

7. The combination as set forth in claim 5, wherein the longitudinal center lines of said parallel links lie in a plane substantially perpendicular to and substantially bisecting said plane including the axes of both king pins.

8. In combination, a vehicle axle; a pair of wheels mounted in side by side relationship on one end of said axle; a non-rotatable hub portion in each wheel; a respective king pin connecting each hub portion to said axle and mounting said wheels for steering movement about said king pins relative to said axle; means including a bracket on the inner hub member for turning the inner wheel about its king pin; and means including a single link disposed to one side of a plane including both king pin axes and pivotally connected at its ends to said hub members by pivots whose axes are substantially parallel to said king pin axes.

9. The combination as set forth in claim 8, wherein the axes of said link pivots are disposed between two planes each including one king pin axis and perpendicular to said plane including both king pin axes.

10. The combination as set forth in claim 8, wherein the distance between the axes of said link pivots is less than the distance between the axes of said king pins.

11. The combination as set forth in claim 8, wherein the longitudinal center line of said link lies in a plane substantially bisecting and perpendicular to both of said king pin axes.

12. In a vehicle having an axle adjacent each end thereof, a set of dirigible dual wheels on each end of each axle, each wheel being mounted on an independent king pin, steering mechanism for the dual wheel sets comprising means interconnecting the two wheels of each dual wheel set for simultaneous steering movement relative to said axle; respective means interconnecting the dual wheel sets at the opposite ends of each axle for simultaneous steering movement; and means interconnecting said respective means for simultaneous steering movement of the wheels of both axles.

13. The combination defined in claim 12, wherein each of said respective means includes a bell crank member, and said means interconnecting said respective means comprises a link assembly extending substantially lengthwise of said vehicle, pivotably connected at its ends to corresponding bell crank members and capable of transmitting force both in compression and tension.

14. A steering axle assembly for a road vehicle comprising an axle rigid from end to end; a set of dual wheels at each end of said axle; an independent king pin for each wheel; means interconnecting the two wheels of each dual wheel set for simultaneous turning movement about the king pin axes; and means interconnecting said two dual wheel sets comprising a bell crank member pivotally supported intermediate its arms on said axle, a cross member on one of the arms of said bell crank member, and a pair of steering links extending over from each end of said cross member to the inner wheel of the adjacent wheel set.

15. The combination defined in claim 14 wherein said cross member is provided with a series of spaced pivot receiving apertures arranged in correlated pairs, each pair comprising one aperture on each side of the transverse center line of said cross member, adapting said bell crank member and said steering links for selective use with vehicles having different length axles.

16. A vehicle axle for mounting dirigible dual wheel sets comprising a structural beam having thickened web portions at its opposite ends, each thickened web portion having a through bore providing a kingpin mounting, said beam also having thickened web portions adjacent each end spaced longitudinally inwardly from said ends, each of said last mentioned thickened web portions having a through bore providing a kingpin mounting, the spacing between said bores at each end being sufficient to permit mounting of each wheel of each dual wheel set for independent steering movement.

17. The axle of claim 16 wherein the web of the main body portion at each side of the transverse centerline of the axle is provided with a through aperture adapted to permit free passage of a portion of the required steering linkage.

DWIGHT E. AUSTIN.

REFERENCES CITED

The following references are of record in the file of this patent:

UNITED STATES PATENTS

| Number | Name | Date |
|---|---|---|
| 792,599 | Knudsen | June 20, 1905 |
| 1,242,279 | Von Elbertz | Oct. 9, 1917 |
| 1,301,971 | Reed | Apr. 29, 1919 |
| 1,811,798 | Lucke | June 23, 1931 |
| 1,965,204 | Sinclair | July 3, 1934 |
| 1,976,068 | Higbee | Oct. 9, 1934 |
| 2,243,181 | Altemus | May 27, 1941 |
| 2,259,813 | Garnett et al. | Oct. 21, 1941 |
| 2,264,785 | Ash | Dec. 2, 1941 |
| 2,343,129 | Ash | Feb. 29, 1944 |

FOREIGN PATENTS

| Number | Country | Date |
|---|---|---|
| 9,464 | Great Britain | Apr. 23, 1907 |
| 489,445 | Great Britain | July 27, 1938 |